United States Patent
Liang et al.

(10) Patent No.: US 12,021,751 B2
(45) Date of Patent: Jun. 25, 2024

(54) DQN-BASED DISTRIBUTED COMPUTING NETWORK COORDINATE FLOW SCHEDULING SYSTEM AND METHOD

(71) Applicant: ZHEJIANG LAB, Zhejiang (CN)

(72) Inventors: Yuan Liang, Hangzhou (CN); Geyang Xiao, Hangzhou (CN); Yuanhao He, Hangzhou (CN); Tao Zou, Hangzhou (CN); Ruyun Zhang, Hangzhou (CN); Xiaofeng Cheng, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 18/454,782

(22) Filed: Aug. 23, 2023

(65) Prior Publication Data

US 2024/0129236 A1 Apr. 18, 2024

(30) Foreign Application Priority Data

Oct. 9, 2022 (CN) .......................... 202211226856.1

(51) Int. Cl.
*H04L 47/12* (2022.01)
*G06N 20/00* (2019.01)
*H04L 41/16* (2022.01)

(52) U.S. Cl.
CPC ............. *H04L 47/12* (2013.01); *G06N 20/00* (2019.01); *H04L 41/16* (2013.01)

(58) Field of Classification Search
CPC .......... H04L 47/12; H04L 41/16; G06N 20/00
See application file for complete search history.

(56) References Cited

U.S. PATENT DOCUMENTS

2019/0347933 A1* 11/2019 Zhang .................... G06N 3/084
2021/0201084 A1* 7/2021 Woo ...................... G06V 10/776
(Continued)

FOREIGN PATENT DOCUMENTS

CN 113254197 A 8/2021
CN 113589842 A 11/2021
(Continued)

OTHER PUBLICATIONS

Notice of Allowance(CN202211226856.1 ); Date of Mailing: Dec. 12, 2022.
(Continued)

*Primary Examiner* — El Hadji M Sall
(74) *Attorney, Agent, or Firm* — W&G Law Group (57) ABSTRACT

The present application discloses a DQN-based distributed computing network coordinate flow scheduling system and method. The method includes: establishing environmental feature data based on distributed computing task information and a congestion situation of a port queue in a programmable forwarding platform on a data plane, establishing and training a deep reinforcement learning intelligent agent based on an action value network and a target network in DQN, and the deep reinforcement learning intelligent agent outputting abstract actions; receiving, by a policy mapper, the abstract actions and mapping them into an executable coordinate flow scheduling policy; executing, by the programmable forwarding platform, the executable coordinate flow scheduling policy and updating the congestion situation of the port queue; and recording, a policy gainer, a completion time of a distributed computing task as a real-time reward of the deep reinforcement learning intelligent agent and iteratively optimizing the deep reinforcement learning intelligent agent.

9 Claims, 4 Drawing Sheets

(56) References Cited

U.S. PATENT DOCUMENTS

| | | |
|---|---|---|
| 2022/0124543 A1 | 4/2022 | Orhan et al. |
| 2022/0202442 A1* | 6/2022 | Hsu .................... A61B 17/3403 |
| 2022/0269536 A1* | 8/2022 | Cui ........................ G06N 3/045 |

FOREIGN PATENT DOCUMENTS

| | | | |
|---|---|---|---|
| CN | 114443249 | A | 5/2022 |
| CN | 114567895 | A | 5/2022 |
| CN | 114615744 | A | 6/2022 |
| CN | 114637262 | A | 6/2022 |
| WO | 2020180014 | A2 | 9/2020 |
| WO | 2022135066 | A1 | 6/2022 |
| WO | 2022160705 | A1 | 8/2022 |

OTHER PUBLICATIONS

First Office Action(CN202211226856.1 ); Date of Mailing: Dec. 2, 2022.
Important-Scientific-Problems-of-Multi-Agent-Deep-Reinforcement-Learning.
Mobile-Ad-Hoc-Network-Routing-based-on-Deep-Reinforcement-Learning.

* cited by examiner

DQN-BASED DISTRIBUTED COMPUTING NETWORK COORDINATE FLOW SCHEDULING SYSTEM AND METHOD

CROSS-REFERENCE TO RELATED APPLICATIONS

The present application claims priority to Chinese Patent Application No. 202211226856.1, filed on Oct. 9, 2022, the content of which is incorporated herein by reference in its entirety.

TECHNICAL FIELD

The present application belongs to the technical field of computer network flow simulation and in particular, to a DQN-based distributed computing network coordinate flow scheduling system and method.

BACKGROUND

In distributed computing tasks, a large number of communication data streams generated among various computing nodes have high parallelism. Therefore, by scheduling coordinate flows coming from different computing devices and interwoven in communication devices, it can effectively save time and economic costs, and also improve the computational efficiency of the distributed computing tasks to provide strong technical supports for subsequent fundamental research.

For designing an optimal coordinate flow scheduling scheme, there is an NP-hard problem. At present, research mainly focuses on two aspects. On the one hand, only the problem of data flow scheduling inside one coordinate flow has been focused, but a dependency relationship between different coordinate flows in a distributed computing task has not been fully considered. Therefore, scheduling coordinate flow only at a data stream level cannot optimize the completion time at the entire computing task level, which does not have a high application value in practice. On the other hand, although optimization is carried out at the level of the entire task to be scheduled and the dependency relationship between different coordinate flows are taken into account, in order to simplify the difficulty of solving, heuristic algorithms are mostly used, and thus only approximate optimal solutions may be obtained, and the performance of the algorithms needs to be improved.

SUMMARY

In view of the shortcomings of the prior art, an objective of the present application is to provide a DQN-based distributed computing network coordinate flow scheduling method. In a scenario of coordinate flow scheduling, according to the present application, a state space required by a deep reinforcement learning intelligent agent is designed, and a congestion situation of a port queue in a programmable forwarding platform on a data plane is added to further describe environmental features. At the same time, in the present application, an action space is divided into succession and discretization for discussion, and a mask is added into an action vector (matrix) according to an adjacent matrix of computing tasks. In addition, in the present application, a task completion time will be calculated as a single-step reward, at a final moment of execution end of the computing tasks, a reward gain function is designed to amplify the incentives of the whole computing task, and a DQN intelligent agent is further guided to achieve a scheduling goal of minimizing the overall elapsed time of the computing tasks.

The present application is implemented through the following technical solution: a first aspect of an embodiment of the present application provides a DQN-based distributed computing network coordinate flow scheduling method, including the following steps:

(1) Establishing environmental feature data based on distributed computing task information and a congestion situation of a port queue in a programmable forwarding platform on a data plane, the distributed computing task information including a dependency relationship between different computing stages, attribute values in a communication stage, and attribute values in the computing stages.

(2) Establishing a deep reinforcement learning intelligent agent based on an action value network and a target network in DQN, the action value network receiving the environmental feature data established in step (1), and training the deep reinforcement learning intelligent agent, and the deep reinforcement learning intelligent agent outputting abstract actions.

(3) Receiving, by a policy mapper, the abstract actions output by the deep reinforcement learning intelligent agent, and mapping the abstract actions into an executable coordinate flow scheduling policy.

(4) Executing, by the programmable forwarding platform on the data plane, the executable coordinate flow scheduling policy generated by the policy mapper, and updating the congestion situation of the port queue.

(5) Recording, by a policy gainer, a completion time of a distributed computing task as a real-time reward for the deep reinforcement learning intelligent agent, and iteratively optimizing the deep reinforcement learning intelligent agent according to an overall elapsed time difference generated by two distributed computing tasks following the executable coordinate flow scheduling policy generated by the deep reinforcement learning intelligent agent.

A second aspect of an embodiment of the present application provides a DQN-based distributed computing network coordinate flow scheduling system, configured to implement the above DQN-based distributed computing network coordinate flow scheduling method, and including:

An environmental feature generation component, configured to establish environmental feature data based on distributed computing task information and measurement information of a programmable forwarding platform on a data plane, and meanwhile the programmable forwarding platform on the data plane executing an executable coordinate flow scheduling policy generated by a policy mapper, and a congestion situation of a port queue being updated.

The programmable forwarding platform on the data plane, configured to identify a self-defined message protocol, to perform message forwarding according to the executable coordinate flow scheduling policy generated by the policy mapper, and to measure a network congestion situation.

A deep reinforcement learning intelligent agent, configured to perform feedforward calculation on the environmental feature data generated by the environmental feature generation component, and to generate abstract actions including successive abstract actions and discrete abstract actions.

A policy mapper, configured to map the successive abstract actions and the discrete abstract actions generated by the deep reinforcement learning intelligent agent into a specific executable coordinate flow scheduling policy of the programmable forwarding platform on the data plane.

A policy gainer, configured to record a completion time of a distributed computing task as a real-time reward of the deep reinforcement learning intelligent agent, and iteratively optimize the deep reinforcement learning intelligent agent according to an overall elapsed time difference generated by two distributed computing tasks following the scheduling policy generated by the deep reinforcement learning intelligent agent.

A third aspect of an embodiment of the present application provides an electronic device, including a memory and a processor; the memory is coupled to the processor; and the memory is configured to store program data, and the processor is configured to execute the program data to implement the above DQN-based distributed computing network coordinate flow scheduling method.

Compared with the prior art, the present application has the beneficial effects: the method adopts a deep reinforcement learning algorithm, a DQN-based deep reinforcement learning intelligent agent is set to interact with to-be-scheduled distributed computing tasks in a data center, and finally a scheduling policy that minimizes the overall elapsed time of the computing tasks is provided. In the present application, environmental feature data required by the deep reinforcement learning intelligent agent is established, the included attribute values of the computing stages and attribute values of the communication stage of the distributed computing tasks and the congestion situation of the port queue in the programmable forwarding platform on the data plane can provide more environmental information for the intelligent agent; and at the same time, the abstract actions output by the intelligent agent are divided into discretization and succession for discussion, and the policy mapper is proposed to map the successive abstract actions and the discrete abstract actions into a specific executable coordinate flow scheduling policy, so that the programmable forwarding platform on the data plane can perform message forwarding according to the executable coordinate flow scheduling policy mapped by the abstract actions. In addition, the policy gainer proposed in the present application can amplify the incentives of the whole computing task, and the intelligent agent is further guided to achieve the goal of minimizing the overall elapsed time of the computing tasks. Compared with other coordinate flow scheduling methods, the method in the present application can achieve automatic adjustment of parameters without relying on manual prior knowledge, and a training process does not need a labeled training data set in traditional supervised learning. At the same time, a deep neural network used may analyze and calculate the distributed computing tasks, achieve rapid analysis and solution in tasks of high complexity, and avoid problems with great difficulty in solving heuristic algorithms.

DESCRIPTION OF EMBODIMENTS

The present application is described in detail with reference to accompanying drawings below. In the case of no conflict, embodiments and features in the implementations may be combined mutually.

The present application provides a DQN-based distributed computing network coordinate flow scheduling system. The system includes an environmental feature generation component, a programmable forwarding platform on a data plane, a deep reinforcement learning intelligent agent, a policy mapper and a policy gainer.

The environmental feature generation component establishes environmental feature data based on distributed computing task information and measurement information of the programmable forwarding platform on the data plane, and meanwhile the programmable forwarding platform on the data plane executes an executable coordinate flow scheduling policy generated by the policy mapper, and a congestion situation of a port queue is updated; the distributed computing task information includes a dependency relationship between different computing stages, attribute values in a communication stage, and attribute values in the computing stages; and the measurement information of the programmable forwarding platform on the data plane includes the congestion situation of the port queue.

The programmable forwarding platform on the data plane is configured to identify a self-defined message protocol, perform message forwarding according to the executable coordinate flow scheduling policy generated by the policy mapper, and measure a network congestion situation.

The deep reinforcement learning intelligent agent is established based on an action value network and a target network in DQN, and is configured to perform feedforward calculation on the environmental feature data generated by the environmental feature generation component, and obtain executable abstract actions, including successive abstract actions and discrete abstract actions.

The policy mapper is configured to map the successive abstract actions and the discrete abstract actions generated by the deep reinforcement learning intelligent agent into an executable specific coordinate flow scheduling policy of the programmable forwarding platform on the data plane.

The policy gainer records a completion time of a distributed computing task as a real-time reward of the deep reinforcement learning intelligent agent, and iteratively optimize the deep reinforcement learning intelligent agent according to an overall elapsed time difference generated by two distributed computing tasks following the scheduling policy generated by the deep reinforcement learning intelligent agent.

Figure 1:
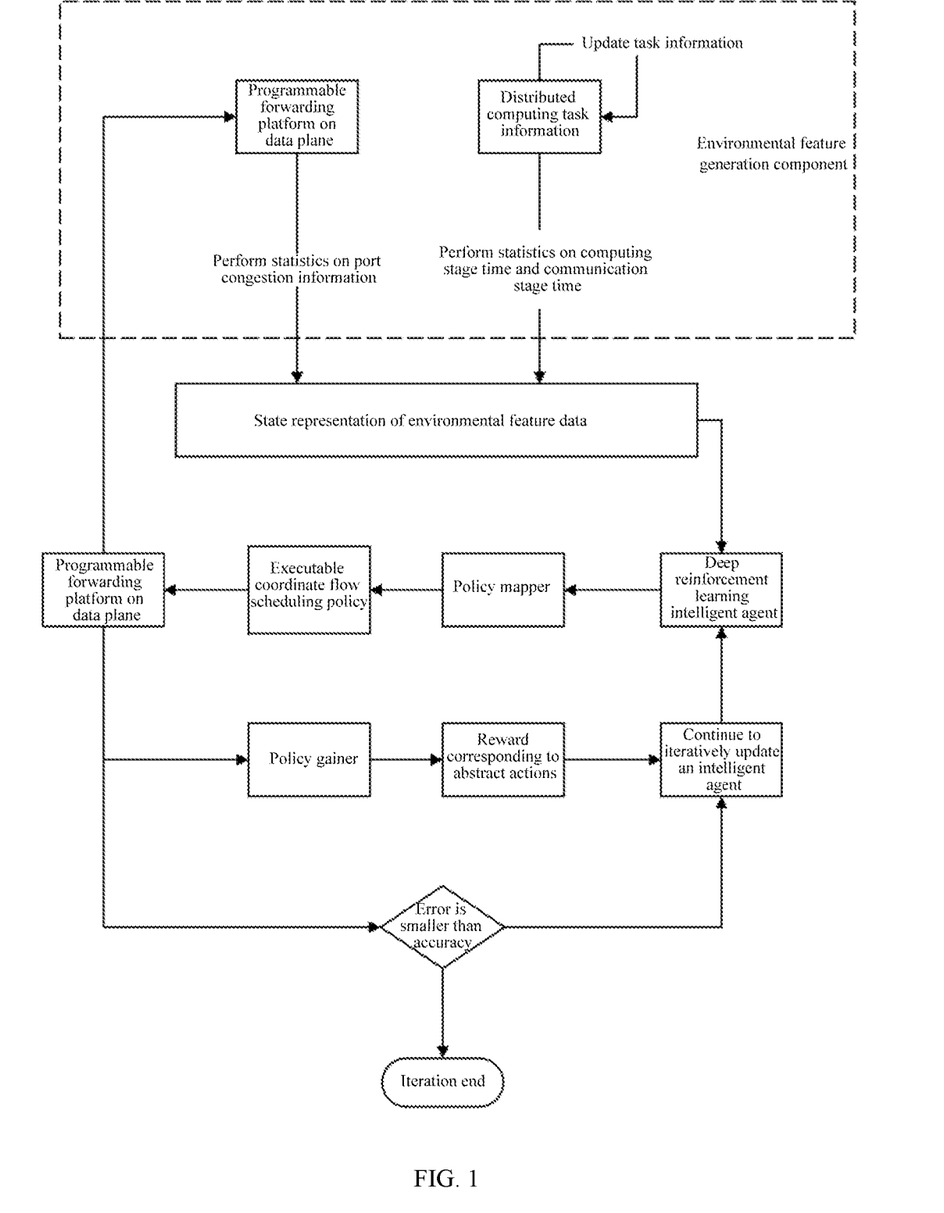
FIG. 1 is a structural block diagram of coordinate flow scheduling in a DQN-based distributed computing network of the present application.

As shown in FIG. 1, the present application provides a DQN-based distributed computing network coordinate flow (Coflow) scheduling method applying the above system, including the following steps:

(1) Environmental feature data is established through an environmental feature generation component based on distributed computing task information and a congestion situation of a port queue in a programmable forwarding platform on a data plane; the distributed computing task information includes a dependency relationship between different computing stages, attribute values in a communication stage, and attribute values in the computing stages.

It specifically includes the following sub-steps:

(1.1) Modeling is performed on the distributed computing tasks with a dependency relationship based on a directed acyclic graph (DAG), and the dependency relationship between different computing stages in the distributed computing tasks and the attribute values in the communication stage are represented by establishing an adjacent matrix, which is specifically as follows:

The dependency relationship between the different computing stages in the distributed computing tasks is represented by establishing the adjacent matrix $C_1$, all elements in the adjacent matrix $C_1$ represent the size of coordinate flows between the different computing stages, namely the attribute values in the communication stage.

(1.2) An elapsed time of each computing stage is calculated as the attribute value in each computing stage, denoted as one one-dimensional vector $C_2$.

(1.3) The congestion situation of the port queue in the programmable forwarding platform on the data plane is obtained through network measurement. The size of the flows that have not been transmitted in the port queue is abstracted into one one-dimensional vector waitQ, and if it is in an initial state, waitQ is empty.

(1.4) The dependency relationship between the different computing stages and the attribute values in the communication stage obtained in step (1.1), the attribute values in the computing stages obtained in step (1.2) and a vector that represents the congestion situation of the port queue in the programmable forwarding platform on the data plane in step (1.3) are spliced into the environmental feature data, which includes:

Performing a straightening operation $\text{Vec}(C_1)$ on a critical matrix $C_1$ that represents the communication stage, and splicing the one-dimensional vector $C_2$ that represents the computing stages and the one-dimensional vector waitQ that represents the congestion situation of the port queue in the programmable forwarding platform on the data plane as a state representation $S=[\text{Vec}(C_1), C_2, \text{waitQ}]$ of the current environmental feature data.

(2) Based on an action value network and a target network in deep Q networks (DQN), a deep reinforcement intelligent agent is established and trained, and the deep reinforcement intelligent agent outputs abstract actions, which includes:

Receiving, by the action value network, the state representation S of the environmental feature data established in step (1), and obtaining a to-be-executed abstract action of the deep reinforcement learning intelligent agent in a current environment through feedforward; and meanwhile, calculating a real value of the abstract action by the target network through feedforward, performing back propagation on a difference between two action values before and after by adopting temporal-difference learning (TD learning) to update the action value network, and updating the target network in a soft target update way. In addition, white noise will be added to the action value network during a training stage to enhance a generalization ability of the intelligent agent, and the white noise will be removed during a testing stage, so that the intelligent agent can make non-interference decisions.

(3) The policy mapper receives the abstract actions output by the deep reinforcement learning intelligent agent, and maps the abstract actions into a specific executable coordinate flow scheduling policy.

Figure 2:
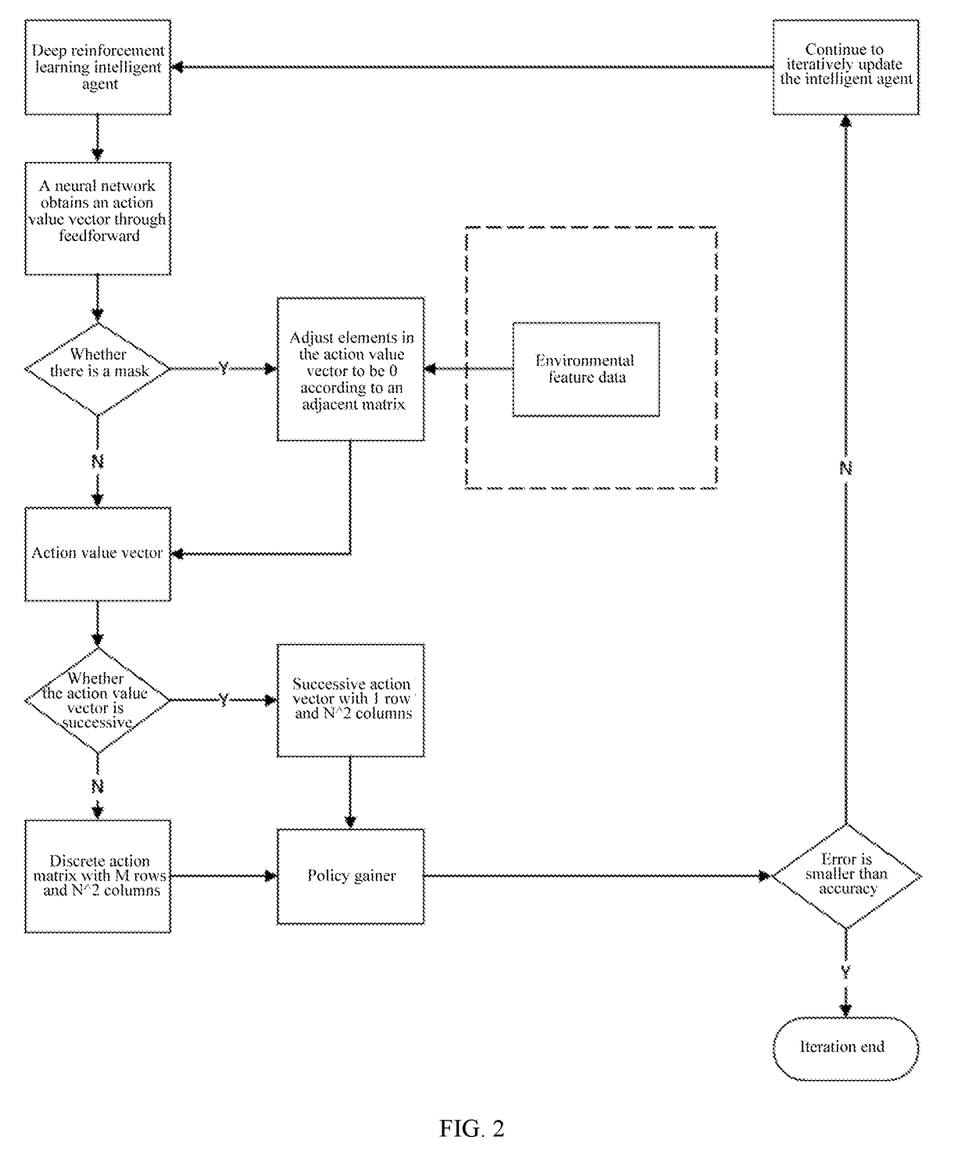
FIG. 2 is a working flow block diagram of a policy mapper.

As shown in FIG. 2, the abstract actions include successive abstract actions and discrete abstract actions, and the successive abstract actions and the discrete abstract actions are mapped into an executable coordinate flow scheduling policy respectively.

Mapping the discrete abstract actions into the specific executable coordinate flow scheduling policy includes:

Assuming that the computing tasks have a total of N computing stages, and the number of the port queue of the programmable forwarding platform on the data plane is M.

(3.1.1) The deep reinforcement learning intelligent agent generates the discrete abstract actions according to a state representation S of the environmental data, and reduces an action space size from a one-dimensional action vector $A_1$ with one row and $M^N$ columns to an action matrix $A_2$ with M rows and $N^2$ columns after dimensionality reduction, wherein $$M_{ij} = \underset{j \in 1,2 \ldots N^2}{\operatorname{argmax}} M_i (i = 1, 2 \ldots M)$$

represents the communication stage of a coordinate flow between every two nodes selecting a $j^{th}$ port queue in the programmable forwarding platform on the data plane, and the selected $j^{th}$ port queue is taken as the executable coordinate flow scheduling policy.

Further, it is considered that the adjacent matrix established by the directed acyclic graph can only be an upper triangular matrix or a lower triangular matrix, meanwhile there is a large number of cases where there is no coordinate flow to be transmitted between every two nodes in a simple computing task, therefore, a mask is added into the action matrix $A_2$ obtained in (3.1.1), that is, if the policy mapper detects that there is no coordinate flow to be transmitted between the nodes in the adjacent matrix, the entire row of corresponding elements in the action matrix $A_2$ are adjusted to be 0.

Mapping the successive abstract actions into the specific executable coordinate flow scheduling policy includes:

Assuming that the computing tasks have a total of N computing stages, and the number of the port queue of the programmable forwarding platform on the data plane is M.

(3.2.1) The deep reinforcement learning intelligent agent generates the successive abstract actions according to the state representation S of the environmental data, and reduces an action space size from a one-dimensional action vector $A_1$ with one row and $M^N$ columns to an action vector $A_2$ with one row and $N^2$ columns.

(3.2.2) Normalization processing is performed on the action vector $$A_2 : A = \frac{A_i - \min(A)}{\max(A) - \min(A)},$$

then $A_i (i \in 1, 2 \ldots N^2)$ represents that the communication stage of the coordinate flow between every two nodes selects a $(A_i // 1/m)^{th}$ port queue in the programmable forwarding platform on the data plane, and the executable coordinate flow scheduling policy is obtained. // is a complementation.

Further, it is considered that the adjacent matrix established by the directed acyclic graph can only be an upper triangular matrix or a lower triangular matrix, meanwhile there is a large number of cases where there is no coordinate flow to be transmitted between every two nodes in a simple computing task, therefore, a mask is added into the action vector $A_2$ obtained in step (3.2.1), that is, if the policy mapper detects that there is no coordinate flow to be transmitted between the nodes in the adjacent matrix, the corresponding positions in the action vector $A_2$ are adjusted to be 0.

(4) The programmable forwarding platform on the data plane executes the executable coordinate flow scheduling policy generated by the policy mapper, and updates the congestion situation of the port queue.

(5) A completion time of a distributed computing task is recorded by a policy gainer as a real-time reward of the deep reinforcement learning intelligent agent, and the deep reinforcement learning intelligent agent is iteratively optimized according to an overall elapsed time difference generated by two distributed computing tasks following the executable coordinate flow scheduling policy generated by the deep reinforcement learning intelligent agent.

Figure 3:
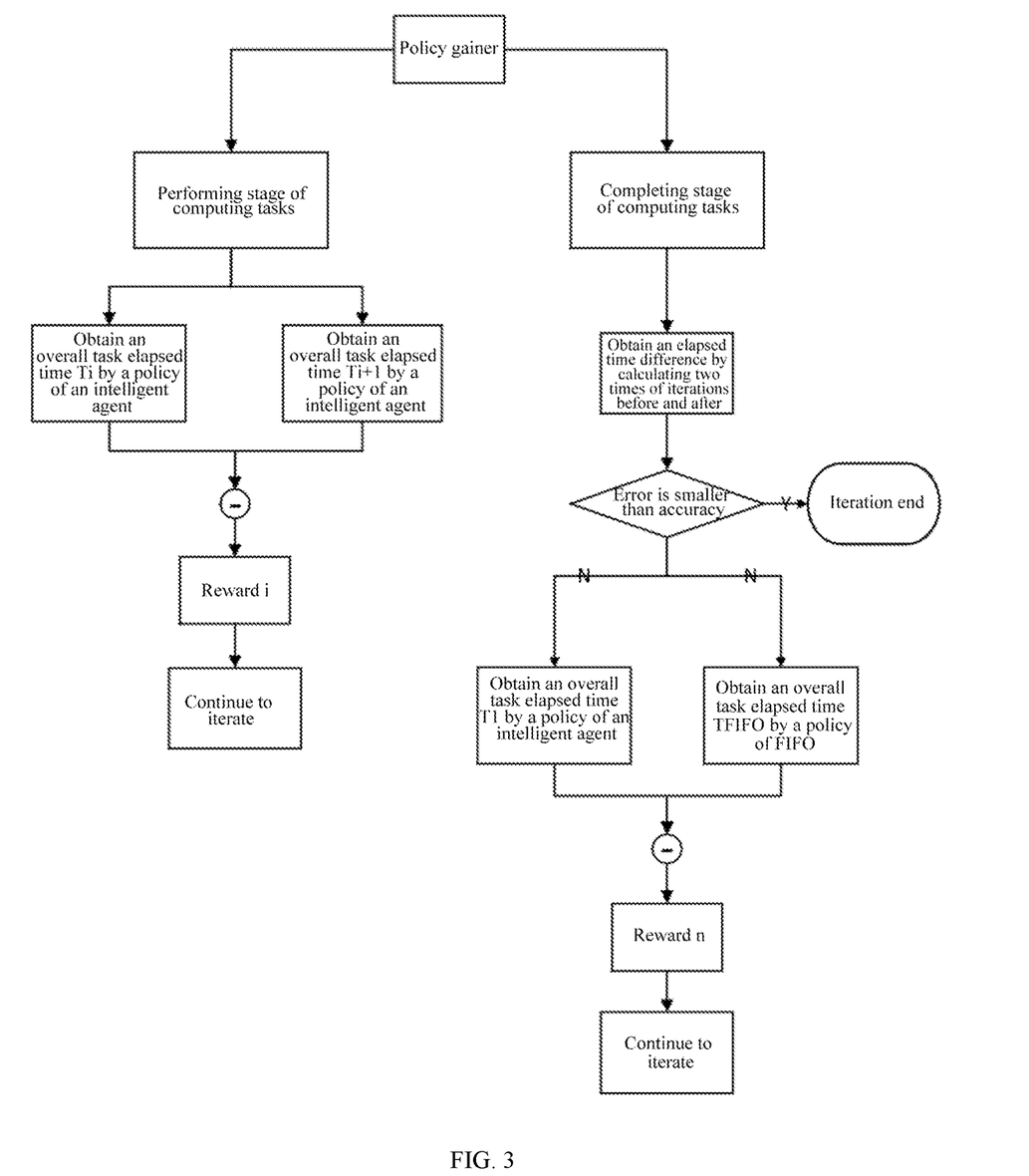
FIG. 3 is a working flow block diagram of a policy gainer.

As shown in FIG. 3, the real-time reward includes reward values corresponding to performing stages of the distributed computing tasks and reward incentives corresponding to completing stages of the distributed computing tasks.

The real-time reward is the reward values corresponding to the performing stages of the distributed computing tasks, and a process of iteratively optimizing the deep reinforcement learning intelligent agent based on the reward values includes:

After executing the coordinate flow scheduling policy generated by the policy mapper, returning, by the programmable forwarding platform on the data plane, a task completion time to the deep reinforcement learning intelligent agent as the reward values corresponding to its generated successive (discrete) abstract actions, and iteratively optimizing the deep reinforcement learning intelligent agent according to an overall elapsed time difference generated by two distributed computing tasks following the executable coordinate flow scheduling policy generated by the deep reinforcement learning intelligent agent.

The real-time reward is the reward incentives corresponding to completing stages of the distributed computing tasks, a process of iteratively optimizing the deep reinforcement learning intelligent agent based on the reward incentives includes:

Measuring an overall elapsed time $T_{model}$ generated by the distributed computing tasks that follow the scheduling policy generated by the deep reinforcement learning intelligent agent at a final moment of the execution end of the distributed computing tasks, comparing a difference between two times of overall elapsed time $T_{model}$ before and after, and in a case that the difference between the overall elapsed time $T_{model}$ is smaller than a self-defined accuracy threshold c, the deep reinforcement learning intelligent agent converging; and in a case that the difference between the overall elapsed time $T_{model}$ is greater than the self-defined accuracy threshold c, iteratively updating the deep reinforcement learning intelligent agent.

A process of iteratively updating the deep reinforcement learning intelligent agent includes: calculating a gap $\Delta_t = T_{model} - T_{FIFO}$ between the overall elapsed time $T_{model}$ generated by the distributed computing tasks that follow the scheduling policy generated by the deep reinforcement learning intelligent agent and an overall elapsed time $T_{FIFO}$ that follows a first in first out (FIFO) scheduling policy, taking the gap $\Delta_t$ as an incentive amplification for the deep reinforcement learning intelligent agent to optimize the deep reinforcement learning intelligent agent, and further guiding the deep reinforcement learning intelligent agent to implement the scheduling goal of minimizing the overall elapsed time of the computing tasks.

Figure 4:
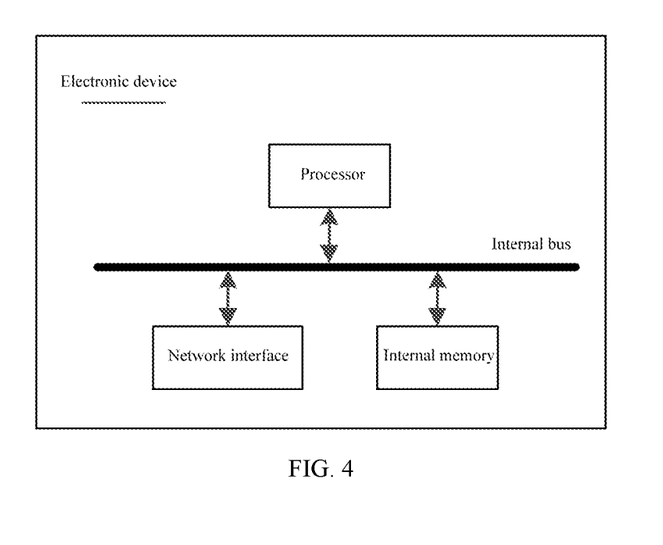
FIG. 4 is a schematic diagram of an electronic device provided by an embodiment of the present application.

Correspondingly, the present application further provides an electronic device, including one or more processors; and a memory, configured to store one or more programs, and the one or more programs, when executed by the one or more processors, cause the one or more processors to implement the above DQN-based distributed computing network coordinate flow scheduling method. As shown in FIG. 4, which is a hardware structural diagram of any device with the data processing capabilities where the DQN-based distributed computing network coordinate flow scheduling method is located provided by an embodiment of the present application, in addition to a processor, an internal memory and a network interface shown in FIG. 4, any device with the data processing capabilities where the apparatus is located in the embodiment may usually further include other hardware according to an actual function of the device with the data processing capabilities, which will not be repeated here.

Those skilled in the art will easily suppose other implementation solutions of the present application after considering the specification and practicing the content disclosed herein. The present application is intended to cover any variations, uses, or adaptations of the present application, which follow general principles of the present application and include common knowledge or commonly used technical means in the art that are not disclosed in the present application. The specification and the embodiments are merely considered as illustrative.

It should be understood that the present application is not limited to the precise structures described above and shown in the accompanying drawings, and various modifications and changes may be made without departing from the scope of the present application.

What is claimed is:

1. A DQN-based distributed computing network coordinate flow scheduling method, comprising:

step (1): establishing environmental feature data based on distributed computing task information and a congestion situation of a port queue in a programmable forwarding platform on a data plane, wherein the distributed computing task information comprises a dependency relationship between different computing stages, attribute values in a communication stage, and attribute values in the computing stages;

step (2): establishing a deep reinforcement learning intelligent agent based on an action value network and a target network in Deep Q Networks (DQN), wherein the action value network receives the environmental feature data established in the step (1) and trains the deep reinforcement learning intelligent agent, and the deep reinforcement learning intelligent agent outputs successive abstract actions and discrete abstract actions;

step (3): receiving, by a policy mapper, the successive abstract actions and the discrete abstract actions output by the deep reinforcement learning intelligent agent, and mapping the successive abstract actions and the discrete abstract actions into an executable coordinate flow scheduling policy;

step (4): executing, by the programmable forwarding platform on the data plane, the executable coordinate flow scheduling policy generated by the policy mapper, and updating the congestion situation of the port queue; and step (5): recording, by a policy gainer, a completion time of a distributed computing task as a real-time reward for the deep reinforcement learning intelligent agent, and iteratively optimizing the deep reinforcement learning intelligent agent according to an overall elapsed time difference generated by two distributed computing tasks following the executable coordinate flow scheduling policy generated by the deep reinforcement learning intelligent agent.

2. The DQN-based distributed computing network coordinate flow scheduling method according to claim 1, wherein the step (1) comprises sub-steps of:

sub-step (1.1): modeling the distributed computing tasks with the dependency relationship based on a directed acyclic graph, and representing the dependency relationship between different computing stages in the distributed computing tasks by establishing an adjacent matrix $C_1$, wherein all elements in the adjacent matrix represent the attribute values in the communication stage;

sub-step (1.2): calculating an elapsed time of each computing stage as the attribute value in each computing stage;

sub-step (1.3): measuring the congestion situation of the port queue in the programmable forwarding platform on the data plane; and sub-step (1.4): splicing the dependency relationship between the different computing stages and the attribute values in the communication stage obtained in the sub-step (1.1), the attribute values in the computing stages obtained in the sub-step (1.2), and a vector that represents the congestion situation of the port queue in the programmable forwarding platform on the data plane in the sub-step (1.3) into the environmental feature data.

3. The DQN-based distributed computing network coordinate flow scheduling method according to claim 1, wherein the step (2) comprises: receiving, by the action value network, the environmental feature data established in the step (1), and obtaining a to-be-executed abstract action of the current deep reinforcement learning intelligent agent through feedforward; calculating a real value of the abstract action by the target network through feedforward, performing back propagation on a difference between two action values before and after by adopting temporal-difference learning to update the action value network, and updating the target network in a soft target update way.

4. The DQN-based distributed computing network coordinate flow scheduling method according to claim 1, wherein a process of mapping the discrete abstract actions into the executable coordinate flow scheduling policy comprises:

assuming that the computing tasks have a total of N computing stages, and a number of the port queue of the programmable forwarding platform on the data plane is M; and generating, by the deep reinforcement learning intelligent agent, the discrete abstract actions according to the environmental feature data established in the step (1), and reducing an action space size of the discrete abstract actions from a one-dimensional action vector $A_1$ with one row and $M^N$ columns to an action matrix $A_2$ with M rows and $N^2$ columns after dimensionality reduction, wherein an equation $$M_{ij} = \underset{j \in 1, 2 \ldots N^2}{\mathrm{argmax}}\, M_i (i = 1, 2 \ldots M)$$

represents the communication stage of a coordinate flow between each pair of nodes selecting a $j^{th}$ port queue in the programmable forwarding platform on the data plane, and the selected $j^{th}$ port queue is taken as the executable coordinate flow scheduling policy.

5. The DQN-based distributed computing network coordinate flow scheduling method according to claim 1, wherein a process of mapping the successive abstract actions into the executable coordinate flow scheduling policy comprises:

assuming that the computing tasks have a total of N computing stages, and a number of the port queue of the programmable forwarding platform on the data plane is M;

generating, by the deep reinforcement learning intelligent agent, the successive abstract actions according to the environmental feature data established in the step (1), and reducing an action space size of the successive abstract actions from a one-dimensional action vector $A_1$ with one row and M N columns to an action vector $A_2$ with one row and $N^2$ columns after dimensionality reduction; and performing normalization processing on the action vector $A_2$, wherein each element $A_i (i \in 1, 2 \ldots N^2)$ in the action vector $A_2$ after normalization processing represents that the communication stage of the coordinate flow between each pair of nodes selects a $A_i//1/m^{th}$ port queue in the programmable forwarding platform on the data plane, and the selected $A_i//1/m^{th}$ port queue is taken as the executable coordinate flow scheduling policy.

6. The DQN-based distributed computing network coordinate flow scheduling method according to claim 4, wherein the process of mapping the discrete abstract actions into the executable coordinate flow scheduling policy further comprises: adding a mask into the action matrix $A_2$; and the process of mapping the successive abstract actions into the executable coordinate flow scheduling policy further comprises: adding a mask into the action matrix $A_2$.

7. The DQN-based distributed computing network coordinate flow scheduling method according to claim 1, wherein the real-time reward comprises reward values corresponding to performing stages of the distributed computing tasks and reward incentives corresponding to completing stages of the distributed computing tasks;

and wherein for the reward incentives corresponding to the completing stages of the distributed computing tasks, a process of iteratively optimizing the deep reinforcement learning intelligent agent based on the reward incentives comprises:

measuring an overall elapsed time $T_{model}$ generated by the distributed computing tasks following the scheduling policy generated by the deep reinforcement learning intelligent agent at an end moment of an execution of the distributed computing tasks, comparing a difference between two times of overall elapsed time $T_{model}$ before and after, in a case that the difference between the overall elapsed time $T_{model}$ is smaller than a self-defined accuracy threshold c, the deep reinforcement learning intelligent agent converging, and in a case that the difference between the overall elapsed time $T_{model}$ is greater than the self-defined accuracy threshold c, iteratively updating the deep reinforcement learning intelligent agent; and a process of iteratively updating the deep reinforcement learning intelligent agent comprises: calculating a gap $\Delta_t = T_{model} - T_{FIFO}$ between the overall elapsed time $T_{model}$ generated by the distributed computing tasks following the scheduling policy generated by the deep reinforcement learning intelligent agent and an overall elapsed time $T_{FIFO}$ following a first-in first-out scheduling policy, and taking the gap $\Delta_t$ as an incentive amplification for the deep reinforcement learning intelligent agent to optimize the deep reinforcement learning intelligent agent.

8. A DQN-based distributed computing network coordinate flow scheduling system, configured to implement the DQN-based distributed computing network coordinate flow scheduling method according to claim 1, and comprising:

an environmental feature generation component configured to establish environmental feature data based on distributed computing task information and measurement information of a programmable forwarding platform on a data plane, and meanwhile the programmable forwarding platform on the data plane executing an executable coordinate flow scheduling policy generated by a policy mapper, and a congestion situation of a port queue being updated;

the programmable forwarding platform on the data plane configured to identify a self-defined message protocol, to perform message forwarding according to the executable coordinate flow scheduling policy generated by the policy mapper, and to measure a network congestion situation;

a deep reinforcement learning intelligent agent configured to perform feedforward calculation on the environmental feature data generated by the environmental feature generation component, and to generate abstract actions comprising successive abstract actions and discrete abstract actions;

a policy mapper configured to map the successive abstract actions and the discrete abstract actions generated by the deep reinforcement learning intelligent agent into a specific executable coordinate flow scheduling policy of the programmable forwarding platform on the data plane; and a policy gainer configured to record a completion time of a distributed computing task as a real-time reward of the deep reinforcement learning intelligent agent, and to iteratively optimize the deep reinforcement learning intelligent agent according to an overall elapsed time difference generated by two distributed computing tasks following the scheduling policy generated by the deep reinforcement learning intelligent agent.

9. An electronic device, comprising a memory and a processor, wherein the memory is coupled to the processor; the memory is configured to store program data, and the processor is configured to execute the program data to implement the DQN-based distributed computing network coordinate flow scheduling method according to claim 1.

* * * * *